United States Patent [19]

Fujii et al.

[11] 4,238,835
[45] Dec. 9, 1980

[54] ANALYZING APPARATUS WITH MICROCOMPUTER

[75] Inventors: Yoshio Fujii; Hiroshi Inomata; Yoshihiko Suenaga; Koji Nishiwaki; Yohei Takashima, all of Katsuta, Japan

[73] Assignee: Hitachi, Ltd., Japan

[21] Appl. No.: 947,833

[22] Filed: Oct. 2, 1978

[30] Foreign Application Priority Data

Sep. 30, 1977 [JP] Japan .................................. 52/118164

[51] Int. Cl.³ ............................ G06F 1/00; G06F 7/00
[52] U.S. Cl. ..................................... 364/900; 364/500; 360/74.4
[58] Field of Search .............. 364/900, 200, 500–502; 360/48, 74.4, 74.5, 79

[56] References Cited

U.S. PATENT DOCUMENTS

| | | | |
|---|---|---|---|
| 3,492,654 | 1/1970 | Fresch et al. | 364/200 |
| 3,705,396 | 12/1972 | Nagaki et al. | 360/74.5 |
| 4,000,518 | 12/1976 | Stearns | 360/74.4 |
| 4,024,505 | 5/1977 | Sperling | 364/200 |
| 4,069,511 | 1/1978 | Lelke | 364/200 |

Primary Examiner—Edward J. Wise
Attorney, Agent, or Firm—Craig & Antonelli

[57] ABSTRACT

An analyzing apparatus is controlled by a microcomputer which reads out programmed information from a magnetic card. The magnetic card does not always travel at a constant speed, and therefore, it is difficult for the microcomputer to entirely resort to the software for carrying out the signal processing required for the control of the analyzing apparatus. In order to obviate this difficulty, a hard logic circuit is provided to read out inverted bit information from the magnetic card, and the information thus read out is supplied to the microcomputer so that the microcomputer can reliably carry out the processing steps including bit counting and data reception. The hard logic circuit includes a flip-flop storing an FM signal recorded on the magnetic card and an exclusive-OR gate comparing the flip-flop output with the FM signal. A simple logic circuit is also provided for writing the FM signal on the magnetic card.

9 Claims, 6 Drawing Figures

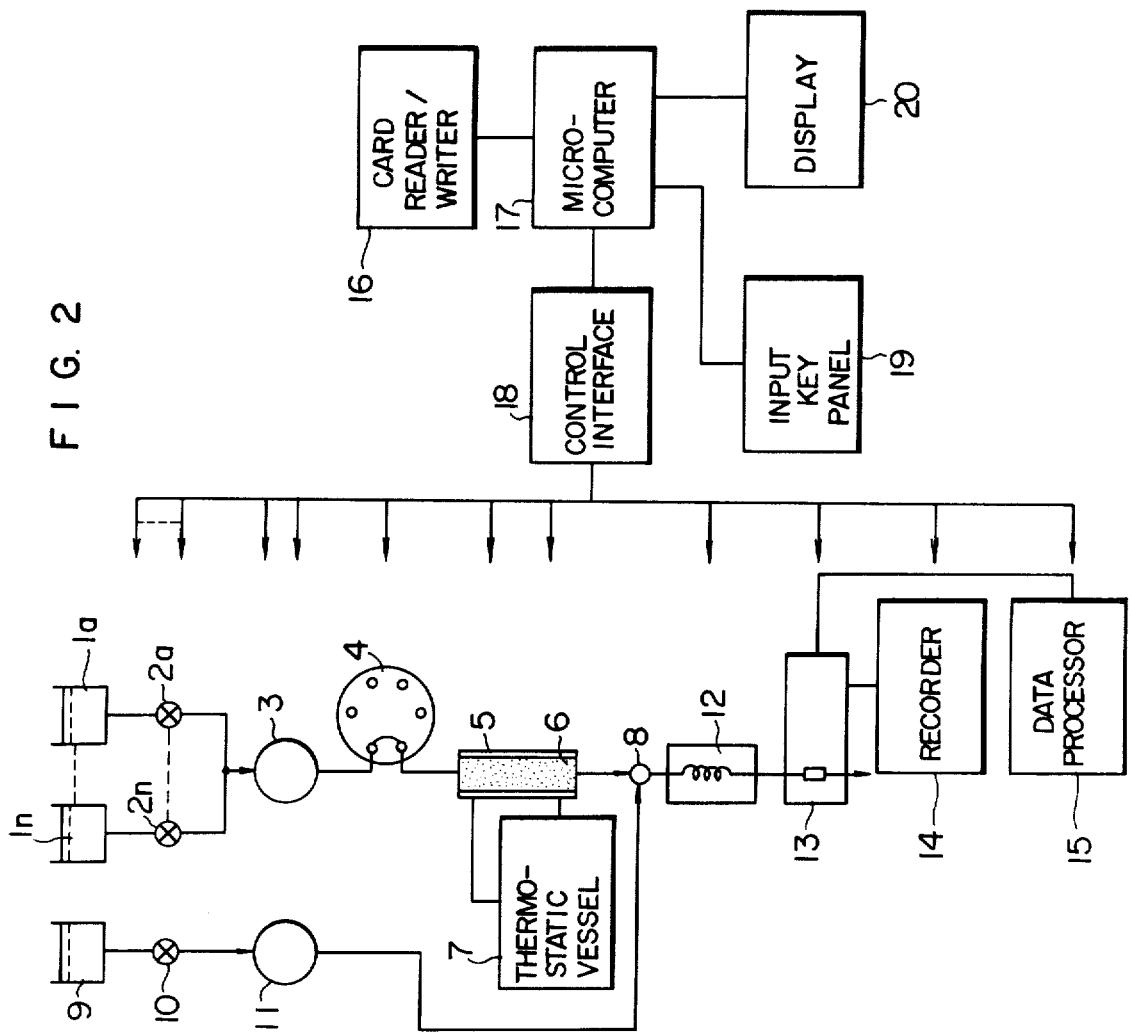
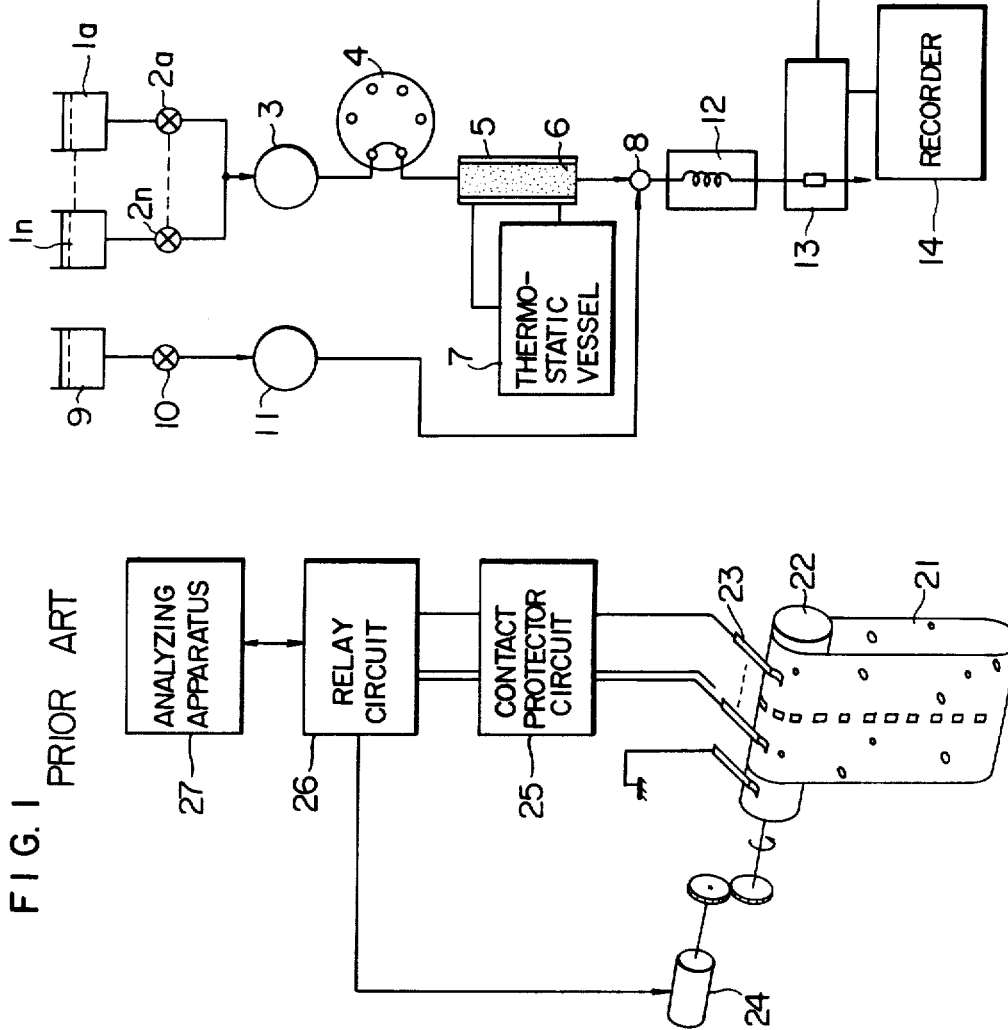

FIG. 5
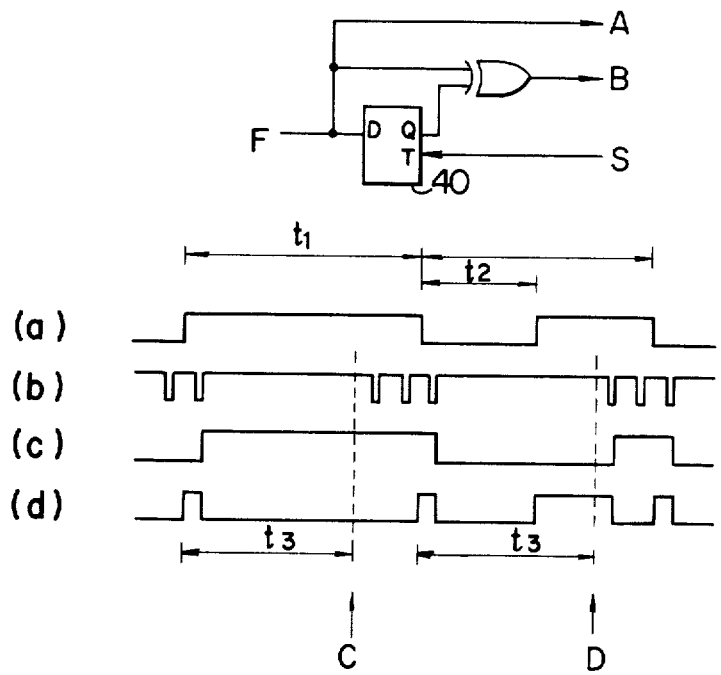
FIG. 6
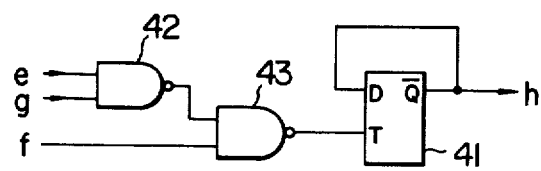
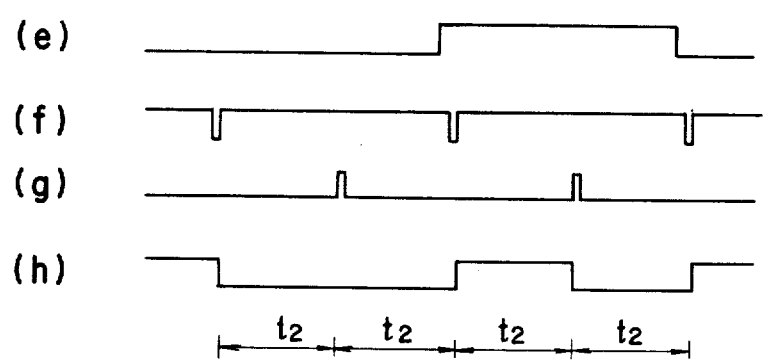

ANALYZING APPARATUS WITH MICROCOMPUTER

FIELD OF THE INVENTION

This invention relates to an analyzing apparatus provided with a microcomputer used, for example, for the physicochemical measurement and analysis of amino acids.

BRIEF DESCRIPTION OF THE DRAWINGS

FIG. 1 shows diagrammatically a prior art programmer for an automatic analyzer using a punched tape for the automatic analysis of amino acids.

FIG. 2 shows diagrammatically the general structure of an embodiment of the automatic analyzing apparatus of the present invention provided with a microcomputer for the automatic analysis of amino acids.

FIGS. 5(a-d) is a circuit diagram of part of a circuit used for reading out the FM signal from the magnetic card shown in FIG. 4 and also shows a time chart of the circuit operation.

FIGS. 6(e-h) is a circuit diagram of part of a circuit used for writing the FM signal on the magnetic card shown in FIG. 4 and also shows a time chart of the circuit operation.

DESCRIPTION OF THE PRIOR ART

Figure 3:
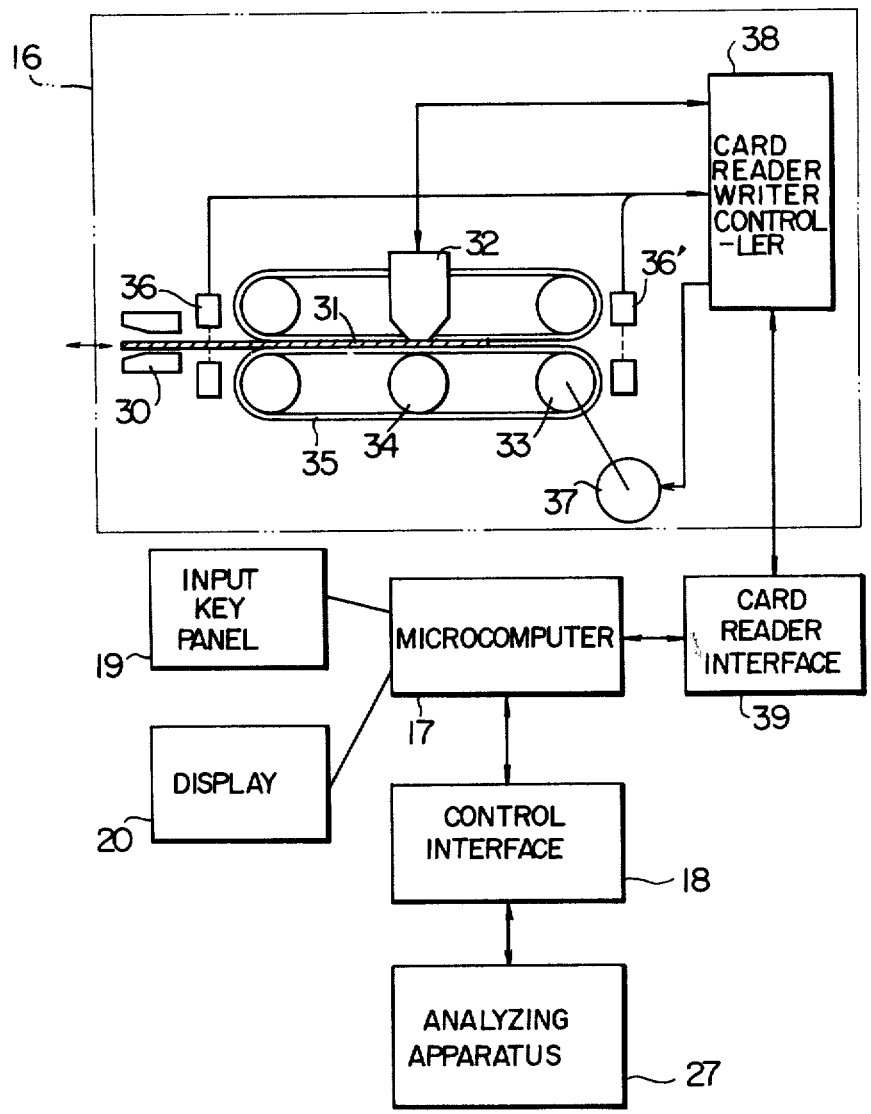
FIG. 3 shows the detailed structure of the magnetic card reader/writer shown in FIG. 2, with the associated units being shown in a block diagram.

Various programmers are employed as an input information source for controlling the operation of an automatic measuring apparatus. For example, programmers used for the analysis sequence control of automatic amino acid analyzers include the timer motor type, drum type, pinboard matrix type, punched card type and punched tape type.

FIG. 1 shows, by way of example, a prior art programmer of the punched tape type used for the automatic analysis of amino acids. Briefly describing, a program tape 21 punched according to a predetermined program is mounted on a tape feed drum 22 as shown and is fed at a constant speed by a motor 24. As the holes of the punched tape 21 move directly beneath a plurality of brushes 23, some of the brushes 23 are connected to ground through the drum 22 to apply pulse signals through a contact protector circuit 25 and a relay circuit 26 to an automatic measuring apparatus 27 which is an amino acid analyzer. The pulse signals are then processed to instruct necessary operations at individual units of the analyzing apparatus 27. A known publication, for example, Japanese Patent Publication No. 37341/77 (published on Sept. 21, 1977) discloses a method of feeding a punched program card adapted for photoelectric reading. The prior art described above has had the following shortcomings:

(1) A considerable length of time is required for the preparation of a program tape or card by punching holes with a puncher.

(2) Once the holes are punched in the tape, amendment thereof is difficult, and the program cycle or period cannot be altered. Thus, a new program tape or card must be prepared.

(3) The mode of control is limited by the number of brushes or photoelectric detecting elements, and preparation of a complex program is thereby limited.

SUMMARY OF THE INVENTION

It is an object of the present invention to provide an automatic analyzing apparatus provided with a microcomputer for obviating the prior art inconvenience and troublesome preparation pointed out above.

Another object of the present invention is to provide an automatic analyzing apparatus having a microcomputer which reads a program written on a magnetic card.

Still another object of the present invention is to provide an analyzing apparatus of the above character which includes a circuit which obviates the difficulty of accurate reading of the program by the microcomputer due to possible non-uniformity of the magnetic card feeding speed.

Yet another object of the present invention is to provide an analyzing apparatus of the above character which includes also a circuit for writing a program on the magnetic card.

The automatic analyzing apparatus according to the present invention comprises a magnetic card reader/writer by which information necessary for the operation of the analyzing apparatus is read from and written on a magnetic card. The output signal of this magnetic card reader/writer is applied to a microcomputer which controls the operation of the analyzing apparatus.

In a preferred embodiment of the present invention, a logic circuit including a flip-flop and an exclusive-OR gate is used to read out an FM signal from the magnetic card. This obviates the problem created by that possible non-uniformity of the magnetic card feeding speed which limits the required signal processing in the microcomputer resulting in impossibility of attainment of all the processing steps required. More precisely, a logic circuit as shown in FIG. 5 is used in the present invention for reading the FM signal instead of reading by the microcomputer. In the preferred embodiment of the present invention, as shown in FIG. 3, the magnetic card 31 is passed between a pair of photosensor elements 36 to be initially set in a loaded position in which its leading end is sandwiched between a pair of belts 35 in the magnetic card reader/writer, so that, upon turning on the power supply for the automatic measuring apparatus, the magnetic card is advanced, and the information written on the magnetic card can be automatically read out to automatically start the measuring operation without the aid of the operator.

In the preferred embodiment of the present invention, the magnetic card is employed as an input medium so that the program recorded thereon can very easily automatically read out therefrom and supplied to the microcomputer, and any operator's skill is not required for the handling. Further, even when the magnetic card is fed at a non-uniform speed, desired measurement can be attained with high accuracy, and the condition of measurement can be easily changed by selecting a suitable magnetic card. The use of the magnetic card as the program input medium and the provision of the microcomputer for the programmed control of the automatic measuring apparatus minimizes physical restrictions and permits rapid application of a complex program to the microcomputer. As is well known, the magnetic card has the following advantages:

(1) It has an appropriate memory capacity.

(2) It can be easily handled and preserved.

(3) It is inexpensive, and its reader/writer is also inexpensive.

(4) Information can be easily written, read, amended and added as desired.

DESCRIPTION OF THE PREFERRED EMBODIMENT

FIG. 2 illustrates the fluid and signal paths when the present invention is applied to the automatic analysis of amino acids. Referring to FIG. 2, one of a plurality of eluents 1a to 1n for amino acids is selectively passed through an associated one of solenoid values 2a to 2n to be fed by a fluid feed pump 3 into a separator column 5 packed with a packing material 6. One of amino acid samples selected by an autosampler 4 is fed into the separator column 5, and the amino acid sample is separated into various amino acids which are supplied to a mixer 8. A circulating type thermostatic vessel 7 maintains the temperature of the separator column 5 at a predetermined setting. A color-forming reagent 9 is supplied through an associated solenoid valve 10 to be fed by a fluid feed pump 11 into the mixer 8, and the fluid mixture is fed from the mixer 8 into a reaction vessel 12 in which the mixture is heated for a predetermined period of time. The amino acid components having developed colors by the color-forming reagent are detected by a photometer 13, and the chromatogram is recorded on a recorder 14. At the same time, a data processing unit 15 prints out the result of analysis. Upon completion of the analysis, the next amino acid sample is supplied from the autosampler 4 into the separator column 5 to be subjected to the analysis. In this manner, the analysis is successively carried out.

In such an automatic analyzing apparatus, the individual units must be sequentially controlled. For this purpose, a magnetic card reader/writer 16 is provided to read out a predetermined program from a magnetic card to supply the information thus read out to a microcomputer 17. The microcomputer 17 makes necessary processing on the supplied information to apply suitable instruction signals to the individual units of the analyzing apparatus through a control interface 18. An input key panel 19 is disposed on the control board of the analyzing apparatus for the purpose of instructing the reading, writing, amendment and addition of the information of the program and also for the purpose of instructing, for example, emergency control in the event of an emergency. A display unit 20 displays the operating state of the analyzing apparatus, the working time for the analysis, unusual conditions occurred in the analyzing apparatus, etc.

The microcomputer 17 which instructs the operation of the individual units of the analyzing apparatus has also the function of monitoring the operating conditions including the pressure and flow rate of the fluid delivered from the pump 3 and the temperature of the thermostatic vessel 7 to maintain them at the designed settings and also stopping the analyzing operation when an unusual operating condition is detected.

FIG. 3 is a block diagram illustrating in detail the structure and operation of the magnetic card reader/writer 16. A magnetic card 31 carrying analysis program information coded according to a predetermined coding scheme is loaded through a tape guide 30 into the magnetic card reader/writer 16 and is ready to be advanced at a constant speed in one direction by being held at its leading end between a pair of belts 35 disposed in the magnetic card reader/writer 16. The lower belt 35 engaging the magnetic card 31 is driven by a drive roller 33 operatively connected to a reversible motor 37. The analysis program information is successively read out by a magnetic head 32 as the magnetic surface of the magnetic card 31 moves past a pinch roller 34. The information signal thus read out is applied to the microcomputer 17 through a card reader controller and then through a card reader/writer interface 39. When the leading end of the magnetic card 31 is advanced to the position at which it is sensed by a pair of photosensor elements 36', the direction of rotation of the motor 37 is reversed to move the magnetic card 31 in the opposite direction. A pair of photosensor elements 36 are provided to detect the presence or absence of a magnetic card 31, and the motor 37 is turned on and off depending on the presence and absence of the magnetic card 31 respectively.

The information read out from the magnetic card 31 and supplied to the microcomputer 17 is checked and amended as required by means of the input key panel 19 and display unit 20. Then, in response to a start signal, necessary instruction signals are applied through the control interface 18 to the analyzing apparatus 27 to instruct the operation of the individual units of the analyzing apparatus 27.

The manner of program reading and writing will now be described. The magnetic card 31 employed in the present invention is of a Japan Bank Association Standard adapted to be recorded with information according to the frequency modulation (FM) method. This standard magnetic card has a recording density of 210 BPI (bits per inch), and its travelling speed is 190 mm/sec ±3.6%.

Figure 4:
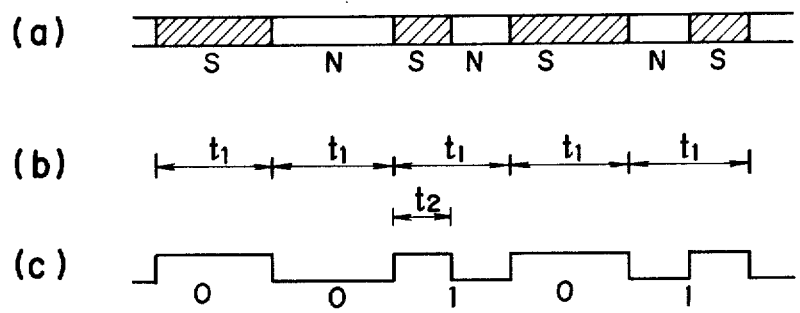
FIGS. 4(a-c) illustrates an FM signal written on a magnetic card used in the automatic analyzing apparatus of the present invention.

FIG. 4 illustrates an FM signal recorded on the magnetic card. Referring to FIG. 4, a bit is a "0" when the same level lasts for a predetermined time interval $t_1$ and is then inverted, while a bit is a "1" when the same level lasts only for a time interval $t_2$ shorter than $t_1$ and is then inverted. Bit groups each including eight such bits are combined to provide a coded signal recorded on the magnetic card. FIG. 4(a) shows the state of magnetization of the magnetic surface of the magnetic card, and FIG. 4(c) shows the corresponding bits. A microcomputer of model SC/MP II (manufactured by National Semiconductor Co., Ltd.) was used for processing such a signal. This microcomputer has serial data input and output terminals and can serially input and output 8-bits information in response to an SIO (serial input/output) instruction signal. Further, this model SC/MP II includes a DLY (delay) instruction part and can therefore be conveniently used for this kind of timing control.

There is, however, a problem to be solved in connection with the above manner of signal processing. That is, an attempt to resort entirely to the software for the desired signal processing will result in difficulty of processing within a shortest processing time, as described below. This is because the travelling speed of the magnetic card tends to become non-uniform, and when such non-uniformity occurs, the data reading timing will include an error which is as large as ±16.2%. In the case of writing data as shown in FIG. 4, $t_1 = 636 \pm 2.5$ μs and $t_2 = 318 \pm 1.3$ μs. Thus, the error is only ±0.4%. In contrast, in the case of reading the data, $t_1 = 636 \pm 104$ μs, and $t_2 = 318 \pm 52$ μs, with the result that the error is ±16.2%.

When the worst combination of $t_1$ and $t_2$ during the data reading is considered, the shortest length of time available before occurrence of the next level inversion is only $(636-104)-(318+52)=162$ μs. It is difficult for the model SC/MP II to carry out the processing steps including the detection of bit inversion, bit counting and data reception within the above period of time. Similar dificulty will also be encountered with a microprocessor operable with a considerably high processing speed. The present invention obviates the above difficulty by detecting the bit inversion by the circuit shown in FIG. 5 in lieu of resorting to the software so that the microcomputer can reliably carry out the processing steps including the bit counting and data reception even within the above period of time.

The structure and operation of the circuit shown in FIG. 5 will now be described. The circuit shown in FIG. 5 includes a flip-flop 40 and an exclusive-OR gate, and the symbols F, S, A and B designate an FM signal read out from the magnetic card, an input strobe pulse signal, a microcomputer input which is the FM signal applied to the microcomputer for the identification of the bit head, and a gate output signal indicative of identification of a data "0" or "1", respectively. The signals F, S and B have waveforms as shown in (a), (b) and (d) respectively, and the output signal of the flip-flop 40 has a waveform as shown in (c) of FIG. 5. The symbols C and D designate the SIO (serial input/output) instructions corresponding to the data "0" and "1" respectively.

The circuit shown in FIG. 5 operates according to the following sequence:

(1) In order to identify the head of each bit written on the magnetic card, the FM signal F is applied to the microcomputer at the input A, and at the same time, the input strobe pulse signal S is applied to the flip-flop 40 to write the bit head in the flip-flop 40.

(2) The fact that the preceding bit level applied to the microcomputer differs from the succeeding bit level presently applied to the microcomputer is identified by the software so as to detect the bit head. As soon as the bit head is identified, the input strobe pulse signal S ceases to be applied to the flip-flop 40.

(3) The exclusive-OR logic of the bit head level stored in the flip-flop 40 (the Q output of the flip-flop 40) and the remaining bit portion of the FM signal F is taken by the hard logic which is the combination of the flip-flop and the exclusive-OR gate.

In 450 μs ($t_3$) after the bit head is identified, the SIO instruction C is applied to the microcomputer for the purpose of sampling of "0" or "1".

(4) Thereafter, the microcomputer starts to take in the FM signal A again so as to identify the bit head of the next bit.

(5) At the time at which the consecutive eight bits have been supplied to the microcomputer, it transfers the eight bits to the memory. This information transfer is completed during the period of time of 450 μs after the bit head of the next bit has been detected but before the SIO instruction D is applied.

The period of time $t_3$ of 450 μs is selected on the basis of the calculation $[(318+52)+(162/2)=452]$ which provides the safest value against the aforementioned timing error.

Now the structure and operation of the circuit used for writing data will be described with reference to FIG. 6. The circuit shown in FIG. 6 includes NAND gates 42, 43 and a flip-flop 41. A data signal having a waveform as shown in (e) of FIG. 6 and a second clock signal having a waveform as shown in (g) are applied to one of the NAND gates 42, and the output signal of this NAND gate is applied to the other NAND gate 43 together with a first clock signal having a waveform as shown in (f). The output signal of the NAND gate 43 is applied to the flip-flop 41 to provide an FM signal having a waveform as shown in (h). The circuit shown in FIG. 6 operates according to the following sequence:

(1) Data to be written on the magnetic card is supplied to the first NAND gate 42 in response to the SIO instruction, and the first clock signal is applied through the second NAND gate 43 to the flip-flop 41 to invert this flip-flop 41.

(2) In 318 μs ($=t_2$) after the application of the first clock signal, the second clock signal is applied to the first NAND gate 42 to invert the flip-flop 41 when the output data of the flip-flop is "1".

(3) In 318 μs after the application of the second clock signal to the first NAND gate 42, the next data is applied to the first NAND gate, and the flip-flop 41 is inverted by the first clock signal.

The FM signal is written on the magnetic card by the repetition of the above steps.

The preferred embodiment of the present invention described hereinbefore provides the following advantages:

(1) Manipulation of buttons on the input key panel is only required for the input and output of a program, and therefore, the operation of the automatic measuring apparatus can be very easily controlled.

(2) A variety of programs can be recorded on individual magnetic cards so that a specific program corresponding to samples of a specific fluid to be analyzed can be simply selected.

(3) It is merely necessary to insert the leading end of a magnetic card between the belts to be initially set in the loaded position in the magnetic card reader/writer. Upon turning on the power supply, the program recorded on the magnetic card is automatically read so that the operation of the analyzing apparatus can be automatically started without the aid of the operator.

(4) A variety of programs can be stored in the microcomputer by preparing a plurality of magnetic cards, thereby eliminating restrictions on the control mode and the number of controlled units, and minimizing also the restrictions on the programmable length of time. Therefore, a variety of complex and time-consuming steps of analysis can be satisfactorily dealt with.

(5) A program can be easily written on a magnetic card by manipulation of a decimal keyboard on the input key panel, and this facilitates checking, amendment, addition and change of information recorded on the magnetic card.

(6) Magnetic cards can be easily handled, preserved and transferred. Further, a microcomputer is used for the reading and writing of information. Therefore, any especial technical knowledge is not required for the operation of the analyzing apparatus.

(7) Information recorded on a magnetic card can be sufficiently read by the combination of a flip-flop circuit and an exclusive-OR gate while ensuring a sufficient margin in the signal processing time. Thus, a microcomputer operating at a relatively low processing speed can be used for the analysis.

(8) Magnetic cards are inexpensive, and the magnetic card reader/writer is also inexpensive.

(9) Even when the operation of the analyzing apparatus is stopped due to interruption of power supply, the analyzing program can be very easily restarted either automatically or manually upon restoration of the power supply.

(10) A control mode can be very simply changed over to another control mode by preparing a plurality of magnetic cards having different programs recorded thereon.

(11) Program memories can be recorded and preserved.

(12) The reliability of analysis can be improved.

While the aforementioned embodiment has been described with reference to an application of the present invention to an apparatus adapted for chromatographic analysis, it is apparent that the present invention is similarly effectively applicable to any other types of physicochemical measuring apparatus.

It will be understood from the foregoing description that the present invention facilitates the input and output of a complex program for the control of the operation of an automatic measuring apparatus so that the operation of the automatic measuring apparatus can be very easily and conveniently controlled.

We claim:

1. An analyzing apparatus whose analyzing operation is controlled by a microcomputer, comprising:
    a magnetic card carrying information required for the operation of said analyzing apparatus;
    a magnetic card reader/writer having means for loading said magnetic card therein and unloading said magnetic card therefrom for reading out said information carried by said magnetic card;
    an information reading circuit delivering a data output indicative of the level of each bit in said information; and
    a microcomputer identifying the head of each bit in said information and receiving the bit level indicative data output of said information reading circuit at a predetermined time after the identification of the head of each bit thereby controlling the operation of said analyzing apparatus.

2. An analyzing apparatus controlled by a microcomputer as claimed in claim 1, wherein a chromatographic process control program is written on said magnetic card.

3. An analyzing apparatus controlled by a microcomputer as claimed in claim 1, wherein said information reading circuit comprises:
    a flip-flop delivering a data output indicative of the head of each bit written on said magnetic card; and
    an exclusive-OR gate taking the exclusive-OR logic of a data output of a magnetic head reading each bit written on said magnetic card and a bit head indicative data output of said flip-flop thereby delivering said bit level indicative data output.

4. An analyzing apparatus controlled by a microcomputer as claimed in claim 1, wherein photosensor means is provided adjacent to a magnetic card intake end of said magnetic card reader/writer for the purpose of automatic loading and unloading of said magnetic card.

5. An analyzing apparatus controlled by a microcomputer as claimed in claim 1, further comprises information writing means for writing on said magnetic card an FM signal corresponding to said information required for the operation of said analyzing apparatus.

6. An analyzing apparatus controlled by a microcomputer as claimed in claim 5, wherein said information writing means comprises:
    a decimal keyboard disposed on an input key panel of said analyzing apparatus for preparing said information required for the operation of said analyzing apparatus;
    a logic circuit delivering a clock pulse output when a data signal is applied in response to an SIO (serial input/output) instruction provided by said microcomputer in conjunction with the application of a first clock signal having a predetermined period and a second clock signal having the same period as said first clock signal to be adapted to occur at a predetermined delay after occurrence of said first clock signal; and
    a flip-flop delivering an output of inverted level in response to the application of said clock pulse output from said fogic circuit, said output of said flip-flop being used to write said FM signal on said magnetic card.

7. A chromatographic apparatus whose analyzing operation is controlled by a microcomputer, comprising:
    a magnetic card having a chromatographic process control program written thereon in the form of an FM signal;
    a magnetic card reader/writer reading out said FM signal from said magnetic card;
    an information reading circuit detecting inversion of the level of each bit in said FM signal thereby delivering a bit level indicative data output; and
    a microcomputer identifying the head of each bit in said FM signal and receiving the bit level indicative data output of said information reading circuit at a predetermined time after the identification of the head of each bit thereby controlling the operation of said chromatographic apparatus according to the information provided by said FM signal.

8. A chromatographic apparatus controlled by a microcomputer as claimed in claim 7, wherein said magnetic card reader/writer comprises means for writing said FM signal on said magnetic card.

9. An apparatus as claimed in claim 1 or 7, wherein said microcomputer comprises serial data input and output terminals and a DLY (delay) instruction part.

* * * * *